(12) United States Patent
Weller

(10) Patent No.: US 11,772,443 B1
(45) Date of Patent: Oct. 3, 2023

(54) UPPER SHOCK MOUNT BRACE

(71) Applicant: Jason Weller, Gilbert, AZ (US)

(72) Inventor: Jason Weller, Gilbert, AZ (US)

( * ) Notice: Subject to any disclaimer, the term of this patent is extended or adjusted under 35 U.S.C. 154(b) by 0 days.

(21) Appl. No.: 17/734,403

(22) Filed: May 2, 2022

(51) Int. Cl.
    *B60G 13/00*     (2006.01)
    *B60R 21/13*     (2006.01)

(52) U.S. Cl.
    CPC ............ *B60G 13/003* (2013.01); *B60R 21/13* (2013.01); *B60G 2204/128* (2013.01); *B60G 2204/43* (2013.01)

(58) Field of Classification Search
    CPC ..... B60R 21/13; B60R 21/131; B60R 21/132; B60R 21/137; B60G 2204/128; B60G 2204/43; B60G 13/003
    See application file for complete search history.

(56) References Cited

U.S. PATENT DOCUMENTS

| | | | | |
|---|---|---|---|---|
| 5,863,049 | A * | 1/1999 | Mahvi | B60P 1/027 280/6.151 |
| 9,290,075 | B2 * | 3/2016 | Cho | B60G 13/003 |
| 10,179,491 | B2 * | 1/2019 | Allegre | B60G 7/02 |
| 10,549,595 | B2 * | 2/2020 | Jung | B62D 25/088 |
| 10,800,367 | B2 * | 10/2020 | Schmitt | B60R 21/13 |
| 11,014,421 | B2 * | 5/2021 | Booth | B60K 17/165 |
| 2004/0129489 | A1 * | 7/2004 | Brasseal | B62D 31/00 180/350 |
| 2015/0123368 | A1 * | 5/2015 | Cho | B60G 13/003 280/124.13 |
| 2017/0274718 | A1 * | 9/2017 | Allegre | F16F 9/54 |
| 2018/0170138 | A1 * | 6/2018 | Jung | B60G 13/003 |
| 2019/0054881 | A1 * | 2/2019 | Schmitt | B60R 21/13 |
| 2020/0317274 | A1 * | 10/2020 | Yoshida | B62D 25/088 |
| 2021/0031580 | A1 * | 2/2021 | Booth | B60G 3/26 |
| 2021/0291604 | A1 * | 9/2021 | Jo | F16F 1/3842 |

FOREIGN PATENT DOCUMENTS

| | | | | |
|---|---|---|---|---|
| CN | 107662466 | A * | 2/2018 | |
| DE | 19949944 | C1 * | 12/2000 | ............. B60R 21/13 |
| DE | 102011102101 | A1 * | 11/2012 | .......... B60G 13/005 |
| DE | 102016111990 | A1 * | 1/2018 | .......... B60G 13/003 |
| DE | 102017118814 | A1 * | 2/2019 | |

(Continued)

OTHER PUBLICATIONS

FR 2810275 A1 translation from espacenet.com Feb. 2023).*

*Primary Examiner* — Paul N Dickson
*Assistant Examiner* — Maxwell L Meshaka

(57) ABSTRACT

A shock bracket brace to fortify a roll cage shock bracket, the shock bracket brace comprising an integral brace body comprising roll cage mount that transitions to a bracket mount through a transition radius having a top surface and bottom surface where at least one through hole can extends from the top surface to the bottom surface. A slot that substantially extends from the bottom surface to near the top surface configured to accommodate a vertical extending portion of the roll cage, wherein the bracket mount comprises a first tab and a second tab extending substantially orthogonally from the bottom surface of the roll cage mount to form a slot configured to accommodate the shock bracket, wherein the first tab and the second tab comprise at least one through hole aligned to accommodate a fastener to pass through the through holes.

11 Claims, 5 Drawing Sheets

(56) References Cited

FOREIGN PATENT DOCUMENTS

| | | | | |
|---|---|---|---|---|
| FR | 2810275 A1 | * | 12/2001 | ......... B60G 21/0551 |
| GB | 2257670 A | * | 1/1993 | ........... B60G 11/465 |
| KR | 20070105142 A | * | 10/2007 | |
| KR | 20110138783 A | * | 12/2011 | |
| KR | 20170087266 A | * | 7/2017 | |
| WO | WO-2021074277 A1 | * | 4/2021 | ............. B60R 21/13 |

* cited by examiner

UPPER SHOCK MOUNT BRACE

CROSS-REFERENCE TO RELATED APPLICATIONS

This application claims benefit from currently U.S. Provisional Application No. 63/230,179 titled "Rear Upper Shock Mount Brace for Can-Am Maverick X3" and having a filing date of Aug. 6, 2021, all of which is incorporated by reference herein.

FIELD OF THE INVENTION

The present specification relates to a shock bracket, even more specifically an upper shock mount support bracket for providing increase support and strength for the rear shock mounts of a utility terrain vehicle.

BACKGROUND OF THE INVENTION

On current utility terrain vehicles ("UTV"), more specifically the Can-Am Maverick X3, the rear shock absorbers are attached to a bracket that are welded onto the UTV's frame. The bracket usually comprises of two mounting tabs that forms a slot wherein the tabs have a through hole. The shock's upper mount fits between the tabs in the slot and is fastened onto the bracket by a bolt. The forces from the shock are transferred into the bracket and onto the welds. The forces transferred from the shock to the bracket can be extreme when riding in the UTV. These forces are usually dynamic in which the shock is pushing up and pulling down on the bracket. With these constant forces on the bracket and welds, the welds eventually start to crack, and the bracket begins to separate from the frame causing catastrophic failure to the UTV and expensive repairs. Current solutions to this problem are to strengthen the bracket with another sheet of material over the top of the bracket or to inspect the welds before each use.

Therefore, there is a need for a shock mount support bracket that provides and creates support and strength to the rear shock brackets.

BRIEF SUMMARY OF THE INVENTION

In embodiments a shock bracket brace to fortify a roll cage shock bracket, the shock bracket brace comprising an integral brace body comprising roll cage mount that transitions to a bracket mount through a transition radius wherein the roll cage mount comprises a top surface and bottom surface having at least one through hole where the hole can extend from the top surface to the bottom surface. A slot that can substantially extends from the bottom surface to near the top surface configured to accommodate a vertical extending portion of the roll cage, wherein the bracket mount comprises a first tab and a second tab extending substantially orthogonally from the bottom surface of the roll cage mount to form a slot configured to accommodate the shock bracket, wherein the first tab and the second tab can comprise at least one through hole aligned to accommodate a fastener to pass through the through holes.

The roll cage mount can further comprise at least one weight reduction slot on a front surface and a back surface. The through holes can match the pattern of the roll cage mounting holes. The roll cage mount can extend away from the transition of the bracket mount with that extension it can gradually slopes down from to the outer edge. The first tab and the second tab can be substantially radiused. The first tab and the second tab through hole can be slotted to allow for play within the through holes on the shock bracket brace and a shock mount. The bracket mount substantially slopes downward from the top surface of the roll cage mount. The shock bracket brace is oriented to accept both a left side or a right side roll cage shock bracket of a vehicle.

A method of installing a shock bracket brace to fortify a roll cage shock bracket comprising removing a vehicle's plastic access panel. Loosing and removing a mounting fastener of a shock of a vehicle. Placing a shock bracket brace over a roll cage shock bracket and on a roll cage mounting platform having at least one through hole. Fastening the shock bracket brace onto the roll cage mounting platform. Fastening a first tab and a second tab through hole with a fastener to the shock bracket and the shock. Torquing the fasteners and reinstalling the vehicle's plastic access panel. The fasteners can be torqued to at least 85 ft-lbs.

It is an object of the invention is to allow the consumer to install a shock bracket brace onto a roll cage shock bracket with ease without having to weld or fabricate additional parts.

It is another object of the invention for the shock bracket brace allows an easy, bolt-on method to prevent costly repairs to the frame of the vehicle.

It is another object of the invention for the shock bracket brace to utilize the vehicle's roll-cage mounting holes on the main chassis as well as the rear upper shock mounting holes to add overall strength to the shock.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for" and will also recite the word "function" (i.e., will state "means for performing the function of . . . , without also reciting in such phrases any structure, material or act in support of the function. Thus, even when the claims recite a "means for performing the function of molding a . . . , step for performing the function of molding a . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 8:
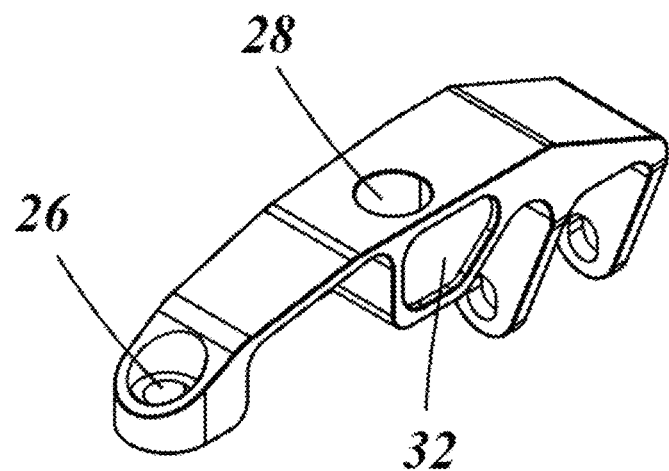
FIG. 8 is a front isometric view of an upper mount shock brace in position on a vehicle in accordance to one, or more embodiments.
Figure 9:
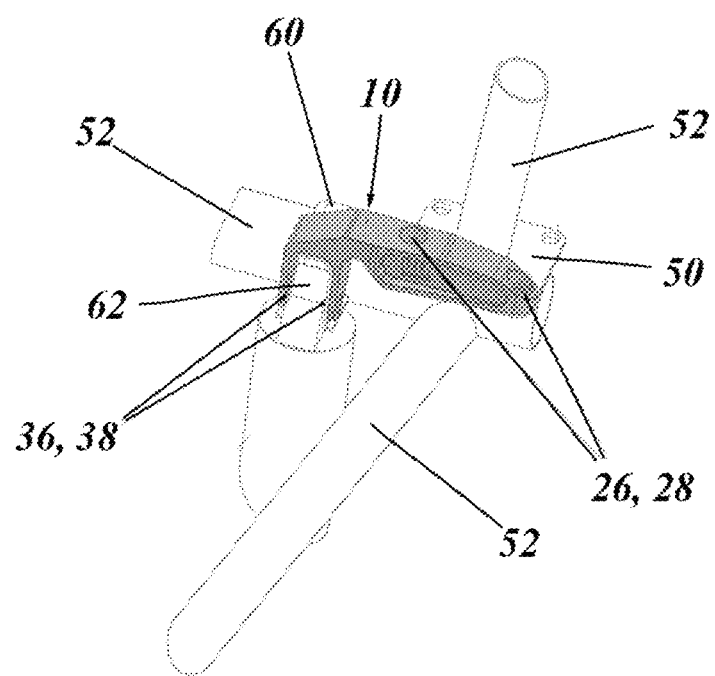
FIG. 9 a back isometric view of an upper mount shock brace installed on a vehicle in accordance to one, or more embodiments.

Referring initially to FIG. 1-8, a shock bracket brace to fortify a roll cage shock bracket is shown generally at 10. The shock bracket brace 10 can comprise an integral brace body 11 comprising a roll cage mount 11 that transitions to a bracket mount 14 through a transition radius 18. The roll cage mount 11 can comprise a top surface 12 and a bottom surface 34 wherein the bottom surface can be mated to and attached to the roll cage mounting platform 50 as shown in FIG. 9. The roll cage mount 11 can comprise at least one through hole 26, 28 that extends from the top surface to the bottom surface wherein the through holes can be counterbored, counter sink, spot face, tapered, tapped, or the like. In the preferred embodiment the roll cage mount 11 has two through holes that correspond to the through holes on a roll cage mounting platform of the vehicle as shown in FIG. 9. The roll cage mount 11 can be attached to the roll cage mounting platform 50 by one or more fasteners, welding, or the like and in the preferred embodiment the roll cage mount can be fastened or attached to the roll cage mounting platform by at least two fasteners which can be a bolt such as a socket head cap screw, head screws, flat head screws, hex head screws, or the like.

In embodiments, the roll cage mount 11 can further comprise a second slot 24 that substantially extends from the bottom surface 34 to the top surface 12, but not through the top surface, configured to accommodate a vertical extending portion of the roll cage 52 as shown in FIG. 9. The second slot 24 can extend between the through holes wherein the second slot can only partially extend through the thickness and width of the roll cage mount as shown in FIG. 8. In certain embodiments the second slot 24 can be omitted.

Figure 1:
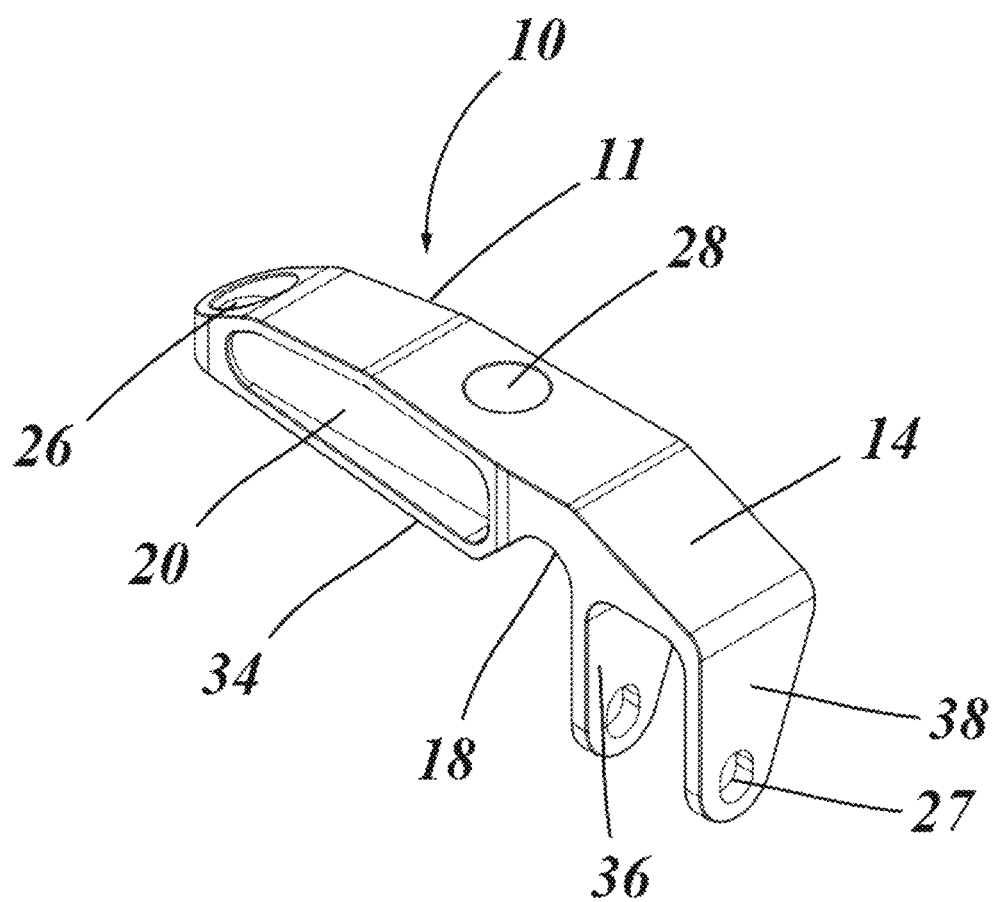
FIG. 1 is a back isometric view of an upper mount shock brace in accordance to one, or more embodiments.
Figure 2:
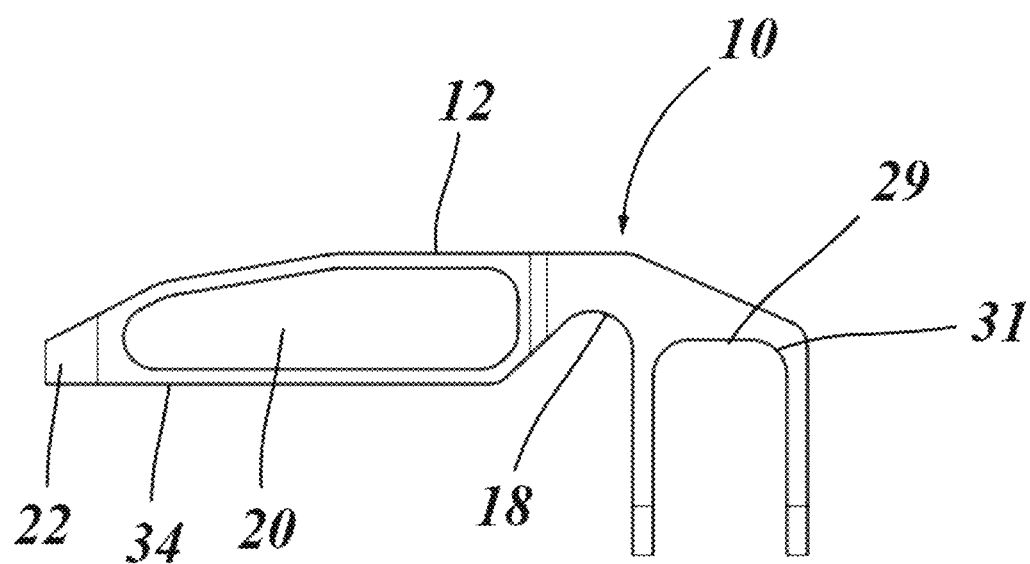
FIG. 2 is a back view of an upper mount shock brace in accordance to one, or more embodiments.
Figure 3:
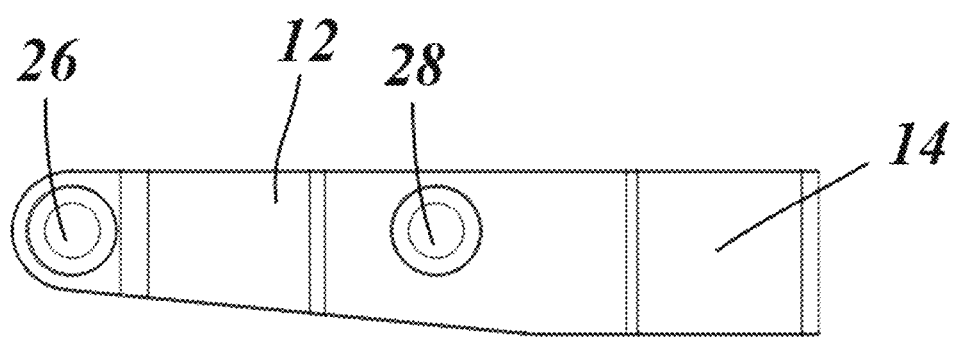
FIG. 3 is a top view of an upper mount shock brace in accordance to one, or more embodiments.
Figure 4:
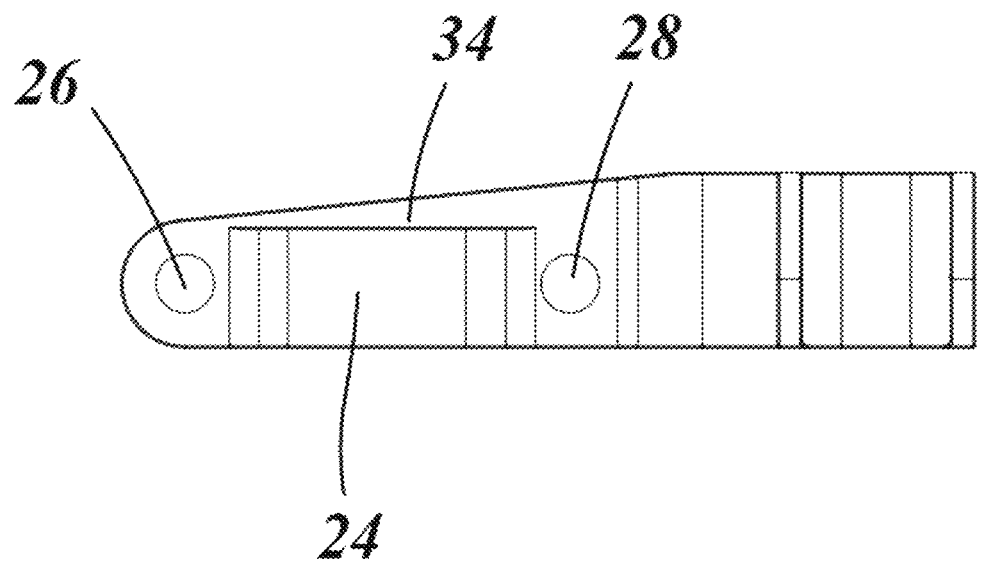
FIG. 4 is a bottom view of an upper mount shock brace in accordance to one, or more embodiments.
Figure 5:
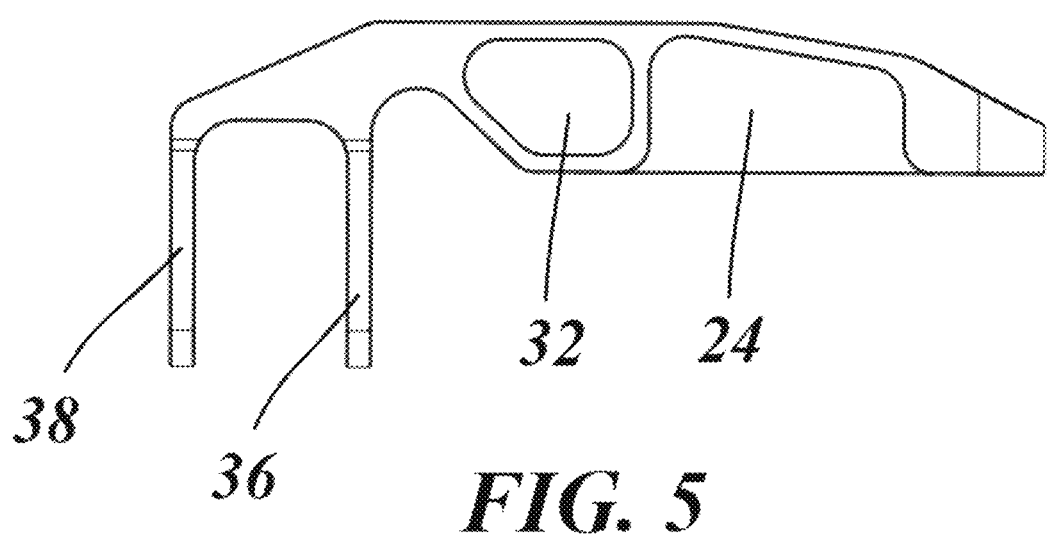
FIG. 5 is a front view of the upper mount shock brace in accordance to one, or more embodiments.
Figure 6:
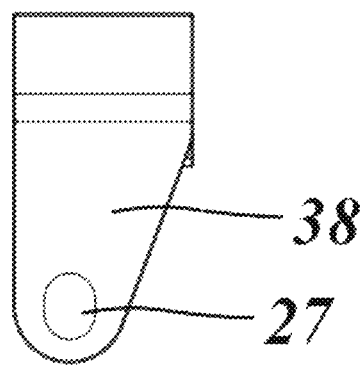
FIG. 6 is a side view of the upper mount shock brace in accordance to one, or more embodiments.
Figure 7:
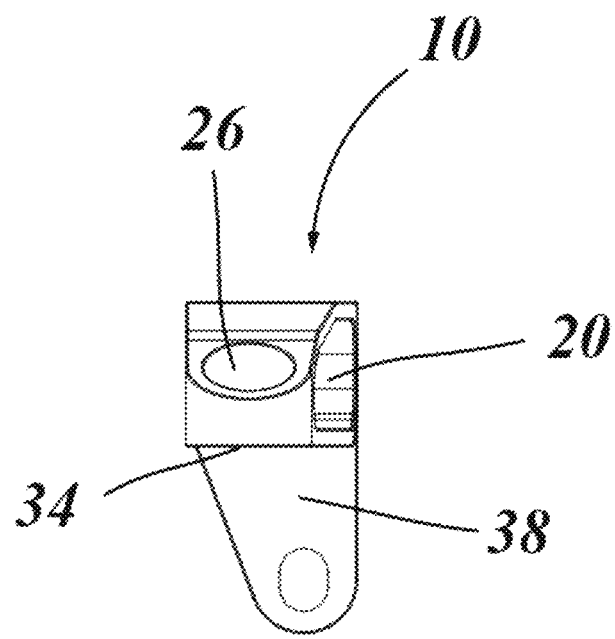
FIG. 7 is the other side view of an upper mount shock brace in accordance to one, or more embodiments.

In embodiments, the roll cage mount 11 can be any shape or size, but in the preferred embodiment the roll cage mount can be rectangular in shape with a downward slope between the through holes 26, 28 as shown in FIG. 1. In certain embodiments, the second slot 24 can at least partially extend through the top surface. In other embodiments the second slot 24 can be omitted and the roll cage mount 11 can be a solid piece of material with only the through holes 26, 28 going through the material. In embodiments, the roll cage mount 11 can further comprise at least one weight reduction groove on the front and the back of the roll cage shock bracket 10 wherein the grooves can be a first groove 20 and a second groove 32 that can partially protrude into the front surface and the back surface wherein the first groove and second groove can reduce the weight of the shock bracket brace 10. In certain embodiments the first groove and second groove can be omitted from the roll cage shock bracket 10.

The bracket mount 14 can comprise a first tab 36 and a second tab 38 extending substantially orthogonally from the bottom surface of the roll cage mount 11 to form a first slot 29 configured to accommodate the shock bracket 60, wherein the first tab and the second tab comprise at least one through hole 27 aligned to accommodate a fastener to pass through the through holes. The first tab 36 and the second tab 38 can have at least one radius 31 transition that forms the first slot 29, wherein in other embodiments the radius can be omitted. The first tab 36 and the second tab 38 can be substantially spaced apart from each other to fit over the shock bracket 60 wherein the through holes 27 can substantially align with the through holes of the shock bracket as shown in FIG. 9.

The through holes 27 can be such as, for example, slots, straight through holes, oval, rectangular slots, tapped holes, or the like to allow for loose fit for the through holes 27 and the through holes on the shock bracket 60, and the hole on the shock head 62 of the shock to align with each other. The first tab 36 and the second tab 38 can have radiused transitions 18 into the bracket mount 14, and in other embodiments it can be chamfered corners, sharp corners, beveled corners or the like. The first slot 29 created by the first tab 36 and the second tab 38 can be substantially wider than the shock bracket 60 creating a loose fit over the shock bracket, or it can be a substantially the same size as the shock bracket, substantially smaller than the shock bracket creating a press fit wherein the forces from the shock can be transferred from the shock bracket to the roll cage shock bracket 10.

In embodiments, the transition radius 18 between the roll cage mount 11 and the bracket mount 14 can alleviate any stress risers that may occur as a UTV's shock pushes against the roll cage shock bracket 10 and the forces are transferred into the vehicles frame. In certain embodiments the transition radius 18 can be omitted. The shock bracket brace 10 can be manufactured from aluminum, stainless steel, titanium, high strength steel, carbon steel or any other material that can be stronger than the material of the vehicle's roll cage shock bracket 60 and the roll cage 52. In yet another embodiment, the shock bracket brace 10 can be machined from a sheet material that is at least between 0.015 inches and 1.25 inches thick, but still more preferable between 0.125 and 1 inch thick and more preferred at 0.125 inches thick, wherein the shock bracket brace can be welded onto the roll cage mounting platform 50 and the shock bracket 60 so that it ties the roll cage to the shock bracket.

A method of installing a shock bracket brace 10 to fortify a roll cage shock bracket comprising removing a vehicle's plastic access panel. Loosing and removing a mounting bolt of a shock of a vehicle. Placing a shock bracket brace over a roll cage shock bracket and on a roll cage mounting platform having at least one through hole. Fastening the shock bracket brace onto the roll cage mounting platform. Fastening a first tab and a second tab through hole with a fastener to the shock bracket and the shock. Torquing the fasteners. Reinstalling the vehicle's plastic access panel. The fasteners can be torqued to such as, for example, between 10 ft-lbs to 150 ft-lbs, but more preferably between 35 ft-lbs and 100 ft-lbs, and most preferred at 85 ft-lbs.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. A shock bracket brace to supplement or replace a vehicle's roll cage shock bracket connecting a shock absorber to a roll cage to fortify the roll cage shock bracket, the shock bracket brace comprising:
    an integral brace body comprising a roll cage mount that transitions to a bracket mount through a transition radius;
    wherein the roll cage mount comprises a roll cage portion having a top surface a bottom surface, a roll cage side and an opposite side opposite to the roll cage side, wherein the bottom surface is configured to be secured against the roll cage;
    a first through hole set that extends through the top surface and the bottom surface;
    a second slot that extends into the roll cage side to accommodate a vertical extending portion of the roll cage;
    wherein the bracket mount comprises a first tab and a second tab extending substantially orthogonally from the bottom surface of the roll cage mount forming a first slot configured to accommodate the shock bracket;
    a second through hole set that extends through the first tab and the second tab to accommodate a fastener to pass through the second through hole set.

2. The upper mount shock bracket brace according to claim 1, wherein the roll cage mount further comprises at least one weight reduction groove on at least one of the roll cage side and the opposite side.

3. The upper mount shock bracket brace according to claim 1, wherein roll cage has a pattern of holes and wherein the first through hole set is spaced to match the pattern.

4. The upper mount shock bracket brace according to claim 1, wherein the roll cage mount has a roll cage transition end near the transition radius and a roll cage distal end, wherein the distance between the top surface and the bottom surface is greater near the transition end and decreases toward the distal end.

5. The upper mount shock bracket brace according to claim 1, wherein the first tab and the second tab has a tab transition end near the transition radius and a tab distal end and the tab distal end of the first tab and the second tab is substantially rounded.

6. The upper mount shock bracket brace according to claim 1, wherein the second through hole set is slotted to allow for play by the fastener within the second through hole set.

7. The upper mount shock bracket brace according to claim 1, further comprising a transition surface opposite the transition radius wherein the transition surface substantially slopes downward from the top surface to the second tab.

8. The upper mount shock bracket brace according to claim 1, wherein the shock bracket brace is oriented to accept both a left side or a right side roll cage shock bracket of a vehicle.

9. The upper mount shock bracket brace according to claim 1, wherein the shock bracket brace is manufactured from some combination of aluminum, stainless steel, carbon steel or any material that is stronger than the material of the vehicle's roll cage shock bracket.

10. A method of installing a shock bracket brace to fortify a roll cage shock bracket comprising:
   removing a vehicle's plastic access panel;
   loosing and removing a mounting fastener of a shock of a vehicle;
   placing a shock bracket brace over a roll cage shock bracket and on a roll cage mounting platform having at least one through hole;
   fastening the shock bracket brace onto the roll cage mounting platform;
   fastening a first tab and a second tab through hole with a fastener to the shock bracket and the shock;
   torquing the fasteners; and
   reinstalling the vehicle's plastic access panel.

11. The method of claim 10, wherein the fasteners can be torqued to at least 85 ft-lbs.

\* \* \* \* \*